No. 614,453. Patented Nov. 22, 1898.
S. Z. DE FERRANTI.
METHOD OF MANUFACTURING ELECTRIC CABLES.
(Application filed Dec. 28, 1897.)
(No Model.) 3 Sheets—Sheet 1.
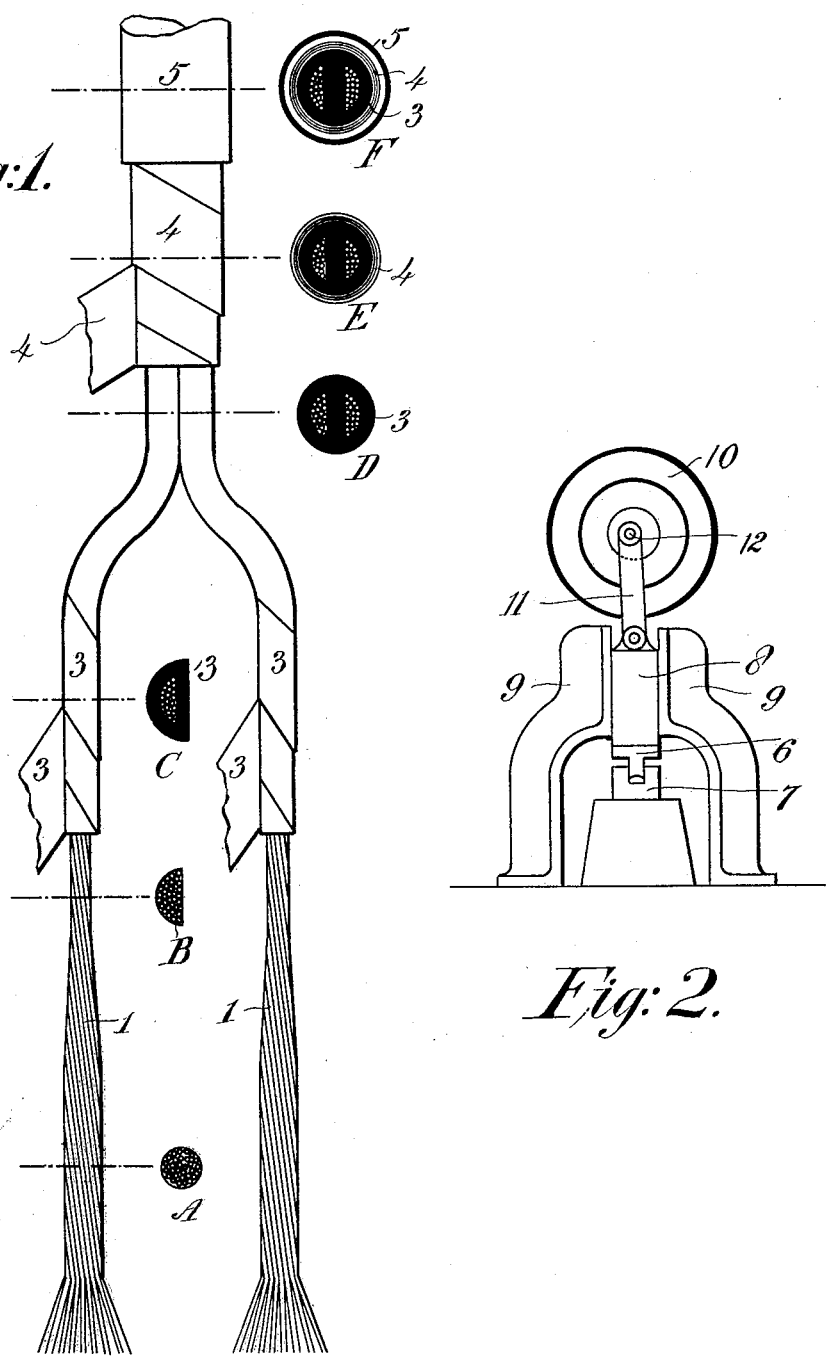
Witnesses
Edwin D. Bartlett.
Frank J. Ames.
Inventor
Sebastian Ziani de Ferranti
per Herbert Sefton-Jones
Attorney.

No. 614,453. Patented Nov. 22, 1898.
S. Z. DE FERRANTI.
METHOD OF MANUFACTURING ELECTRIC CABLES.
(Application filed Dec. 28, 1897.)
(No Model.) 3 Sheets—Sheet 2.
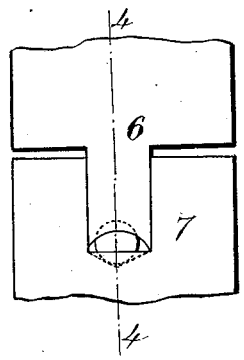
Fig: 3.
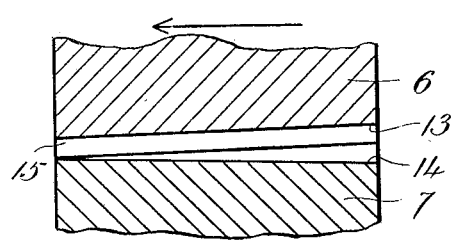
Fig: 4.
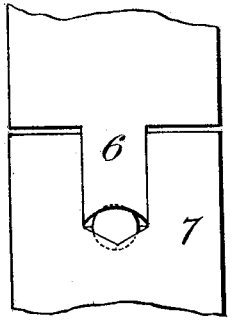
Fig: 5.
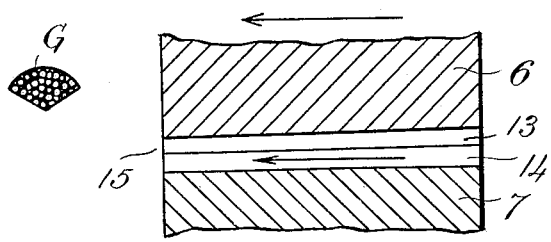
Fig: 6.
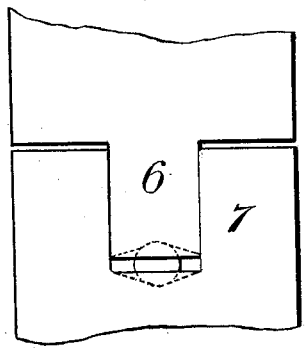
Fig: 7.
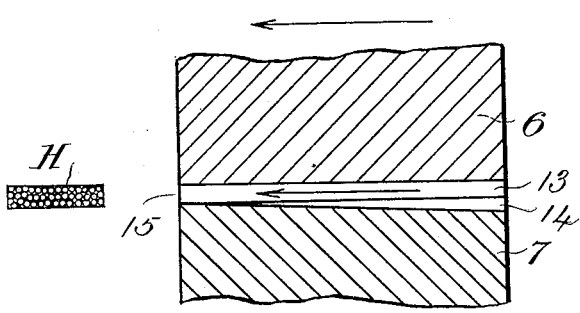
Fig: 8.
Witnesses.
Edwin Drew Bartlett
Frederick William Le Tall
Inventor
Sebastian Ziani de Ferranti
per Herbert Sefton-Jones
Attorney.
THE NORRIS PETERS CO., PHOTO-LITHO., WASHINGTON, D. C.

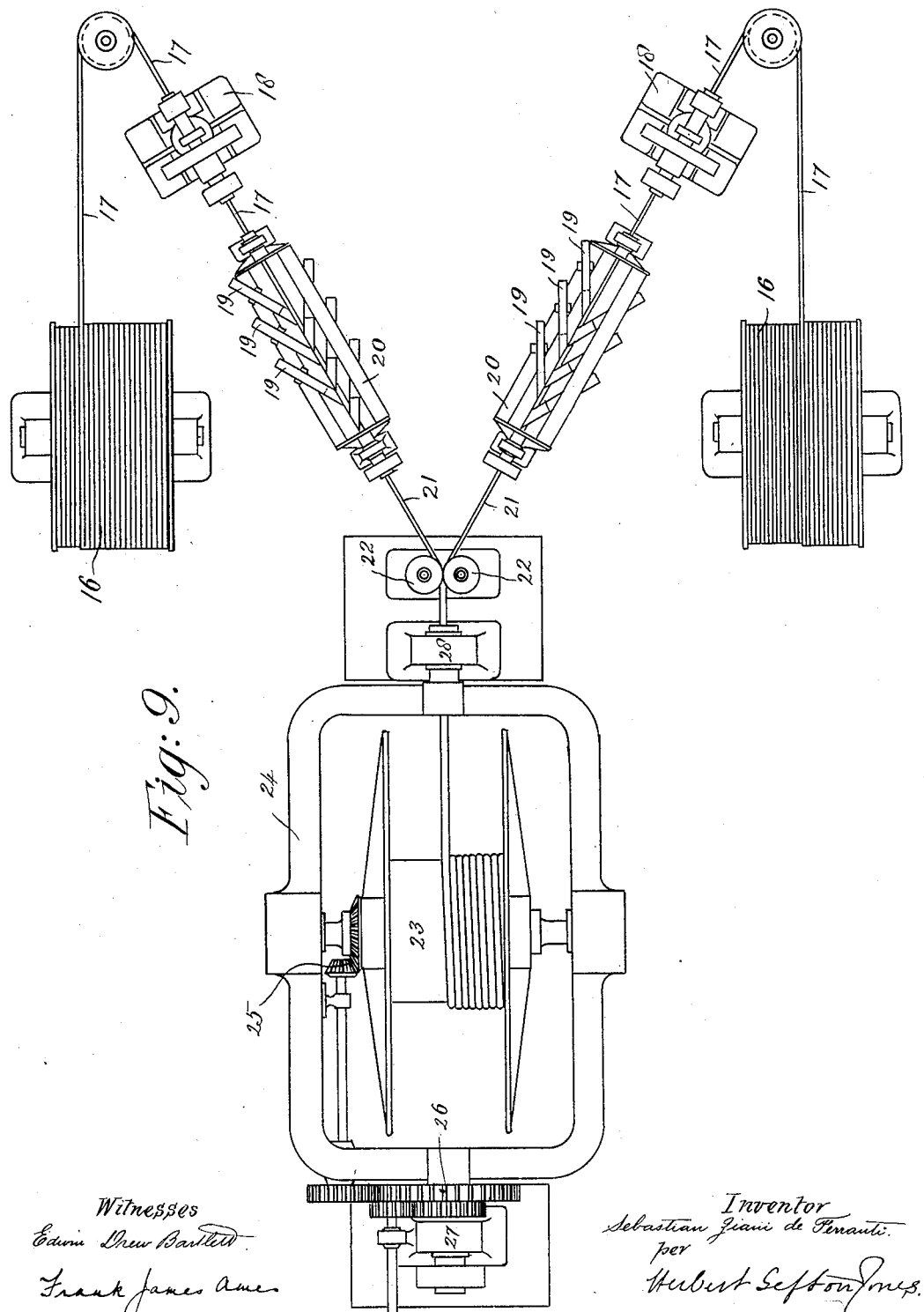

UNITED STATES PATENT OFFICE.

SEBASTIAN ZIANI DE FERRANTI, OF HOLLINWOOD, ENGLAND.

METHOD OF MANUFACTURING ELECTRIC CABLES.

SPECIFICATION forming part of Letters Patent No. 614,453, dated November 22, 1898.

Application filed December 28, 1897. Serial No. 663,994. (No model.)

*To all whom it may concern:*

Be it known that I, SEBASTIAN ZIANI DE FERRANTI, electrical engineer, a subject of the Queen of Great Britain, residing at Hollinwood, in the county of Lancaster, England, have invented a new and useful Improvement in Methods of Manufacturing Electric Cables, (Case No. 1,) (for which I have obtained a patent in Great Britain, No. 3,363, dated February 9, 1897,) of which the following is a specification.

This invention has for its object an improved method of manufacturing electric cables of the kind or class described in the specification for "Improvement in electric cables," filed on the same date as the present application, Serial No. 664,000.

According to my invention I construct electric cables containing two or more conductors, said conductors being insulated from each other and suitable for conveying currents for electric lighting or the distribution of electrical energy. The several conductors are shaped to form a portion of a circle in cross-section, so that when laid together with their insulation an approximately cylindrical cable is formed.

An essential feature of cables manufactured by my present invention is that the several conductors are made of separate strands of wires in intimate contact with each other, the area of the stranded wires being very little larger than the area of a solid conductor of the same current-carrying capacity.

In constructing a cable according to my invention I strand up copper wires in the usual way, so as to make a cylindrical conductor of approximately the same area as it is desired that the conductor shall eventually have when made up into a cable. I pass this cylindrical stranded conductor through a quickly-reciprocating press containing dies of the shape which it is desired to give to the conductor. This press may be run by means of a crank, or it may be in the form of a pneumatic hammer or other similar device for quickly opening and closing the dies.

I form the dies of a tapering section in the direction of the motion of the cable which it is desired to press, so that the end of the conductor which is to be dealt with may enter the dies and is only deformed a small amount at first. As, however, it feeds through the tapering dies every blow presses it more nearly into the shape which it is desired to give it. The pressed conductor is insulated with paper or other fibrous material in any suitable manner, and two or more such insulated conductors are placed together and insulated to form a cylindrical cable. The cable may finally be sheathed with lead or other protective material.

In order that my invention may be clearly understood, I will proceed to describe the same with reference to the accompanying drawings, in which—

Figure 1 illustrates a cable in its various stages of manufacture, the section at different stages being shown by small figures A B C D E F, taken at the dotted lines above said figures. Fig. 2 shows a suitable form of press. Fig. 3 is an elevation, and Fig. 4 a section, on the line 4 4, Fig. 3, of a pair of dies suitable for giving the conductor a semicircular cross-section. Figs. 5 and 6 are similar views, respectively, of a pair of dies for giving the conductors the shape of a sector of a circle in cross-section. Figs. 7 and 8 are similar views of a pair of dies for compressing a circular conductor to a rectangular form in cross-section. Fig. 9 is a plan illustrating a plant for the manufacture of a cable comprising two insulated conductors.

Referring now to Fig. 1, which illustrates the manufacture of a twin conductor-cable, 1 are the several strands composing the conductors. These are laid up by suitable machinery well known to persons skilled in the art to form a circular conductor, the cross-section of which is shown at A. The two such conductors are led through presses—such as hereinafter described, for example—and deformed to the shape of a semicircle in cross-section, as shown at B. The separate wires composing each conductor are thereby pressed into intimate contact with each other, and the conductor is reduced in its gross area without reducing any of its current-carrying capacity and with little loss of flexibility. The two semicircular conductors are now insulated in any suitable manner—for example, by being wrapped with an insulating-tape, such as indicated at 3. After insulating the cross-section of each insulated conductor will be similar to that shown at C. The two insulated conductors are next laid together to form a cable, the cross-section of which is shown at D and the whole insulated with another layer of insulation 4. The cross-section will now be as shown at E. A protecting-sheath, of lead or other suitable material 5, may then be placed around the insulated cable, the section of which is shown at F.

The various stages in the manufacture of my improved cable as above described are well-known to cable manufacturers, with the exception of the device for pressing uninsulated conductors from a cylindrical form to that desired. The apparatus for accomplishing this is illustrated in Fig. 2, which I will now proceed to describe.

6 7 are a pair of dies, the upper one of which is supported in the end of a slide 8, adapted to slide vertically in guides 9 9 of any suitable design. The lower die 7 is firmly supported upon a block. The slide 8 is connected by a link 11 to an eccentric-pin 12 on the fly-wheel 10, which is caused to rotate by any suitable means. The upper die is thereby caused to reciprocate and to strike a number of blows in succession as the cable is passed through the press. The shapes of the dies when it is desired to cause the conductor to issue in a semicircular shape are shown drawn to an enlarged scale in Figs. 3 and 4. The entering end 13 14 of the two dies being shaped so as to only slightly deform a circular cable, at the exit end 15 said dies are made of the shape which it is required the conductor shall finally assume. Consequently the conductor is gradually deformed as it passes through.

By running the press at a high speed I am enabled to draw a circular cable almost continuously through it and bring it out shaped to the desired section.

Figs. 5 and 6 show dies which deform a circular stranded cable to the shape shown at G in cross-section, and Figs. 7 and 8 are similar views, which deform a circular cable to the shape shown at H in cross-section. The arrows in the several figures show the direction of movement of the conductor between the dies.

Fig. 9 shows, diagrammatically, a plant for the construction of a cable constructed of two conductors, as hereinabove described with reference to Fig. 1, in which the insulated conductors are laid together spirally. 16 are drums containing circular stranded conductors. Said conductors (marked 17) are led through reciprocating presses 18, of the kind described with reference to Fig. 2, for example, which presses shape each conductor to a semicircular form in cross-section. The semicircular conductors are now wrapped spirally with insulating-paper 19 by means of the apparatus shown at 20, said apparatus being well known, and the separate insulated conductors 21, after issuing from this apparatus, are led around guide-rollers 22, being finally wound upon a drum 23. Said drum is supported in bearings in a framework 24 and is arranged to be rotated through the bevel-gears 25 from the gear-wheel 26. The frame 24 is rotated in bearings 27 and 28, through the front one of which, 28, the two conductors pass. Owing to the double movement of said drum—namely, on its own axis and upon the axis at right angles to the line of travel of the cable—said conductors are twisted at the same time as they are wound upon the drum.

The insulation surrounding the separate conductors and the cable may be of any suitable description according to the duty which the cables have to perform, and I do not confine myself to the use of paper for this purpose.

What I claim is—

1. The method of manufacturing electric cables for electric-light and power distribution which consists in first forming a circular stranded conductor, compressing said conductor to the shape of a part of a circle in cross-section, insulating said conductor, and lastly laying a number of such conductors together forming an approximately cylindrical cable, as set forth.

2. The method of manufacturing electric cables which consists in first forming a circular stranded conductor to the shape of a part of a circle in cross-section, insulating said conductors, and lastly laying a number of such conductors together spirally forming an approximately cylindrical cable, as set forth.

3. The method of manufacturing electric cables which consists in first forming a circular stranded conductor, passing the same between reciprocating dies to compress it to the shape of part of a circle in cross-section, insulating said conductor, and lastly laying a number of such conductors together to form an approximately cylindrical cable, as set forth.

4. The method of manufacturing electric cables which consists in first forming a circular stranded conductor, passing the same between reciprocating dies to compress it to the shape of a circle in cross-section, insulating said conductor, laying a number of such conductors together to form an approximately cylindrical cable, and lastly covering said cable with a leaden sheath, as set forth.

5. The method of manufacturing electric cables which consists in first forming a circular stranded conductor, compressing said conductor to the shape of a part of a circle in cross-section, wrapping said conductor with insulating-paper, and lastly laying a number of such conductors together to form an approximately cylindrical cable, as set forth.

6. The method of manufacturing electric cables which consists in first forming a circular stranded conductor, compressing said conductor to the shape of a part of a circle in cross-section, wrapping said conductor with insulating-paper, and lastly laying a number of such conductors together spirally to form an approximately cylindrical cable, as set forth.

7. The method of manufacturing electric cables for electric-light and power distribution which consists in first forming a circular stranded conductor, compressing said conductor to the shape of a part of a circle in cross-section, wrapping said conductor spirally with strips of sheet insulation, and lastly laying a number of such conductors together to form an approximately cylindrical cable, as set forth.

8. The method of manufacturing electric cables for electric-light and power distribution which consists in first forming a circular stranded conductor, compressing said conductor to the shape of a part of a circle in cross-section, wrapping said conductor spirally with strips of sheet insulation, laying a number of such conductors together spirally to form an approximately cylindrical cable, and lastly covering said cable with a leaden sheath, as set forth.

In testimony whereof I have signed my name to this specification in the presence of subscribing witnesses.

SEBASTIAN ZIANI DE FERRANTI.

Witnesses:
    W. M. HARRIS,
    WILMER MATTHEWS HARRIS,
    FREDERICK COWLEY HARRIS.